O. SCHLAUPITZ.
INDICATING GAUGE.
APPLICATION FILED JAN. 9, 1922.
1,435,666.
Patented Nov. 14, 1922.
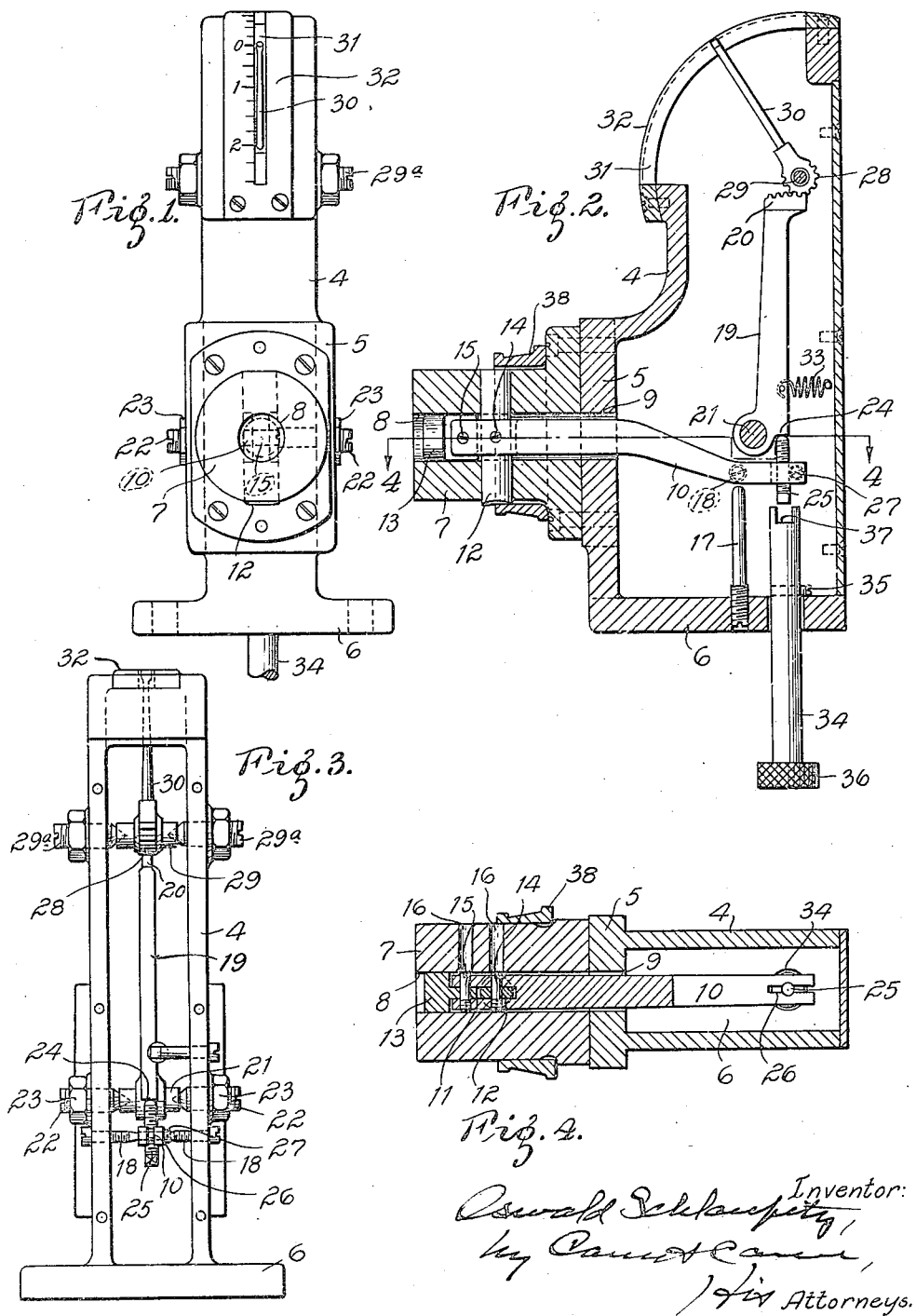

Patented Nov. 14, 1922.

1,435,666

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

INDICATING GAUGE.

Application filed January 9, 1922. Serial No. 527,896.

*To all whom it may concern:*

Be it known that I, OSWALD SCHLAUPITZ, a citizen of the United States, and a resident of the city of Canton, in the county of Stark and State of Ohio, have invented a new and useful Improvement in Indicating Gauges, of which the following is a specification.

This invention relates to internal indicating gauges and has for its principal object to produce a gauge that will determine the diameter and the contour and parallelism of the surfaces of circular cavities or perforations, such as the cylindrical bores of inner bearing members for roller bearings. Another object is to simplify the gauging operation. Another object is to simplify the construction of the gauge and to reduce the cost thereof.

The invention consists in the hereinafter described means for attaining the above objects; and it also consists in the parts and combinations of parts hereinafter described and claimed.

In the accompanying drawings, which form part of the specification and wherein like symbols refer to like parts wherever they occur, Fig. 1 is a front elevation of an indicating gauge embodying my invention;

Fig. 2 is a vertical section through said gauge, an inner bearing member for a roller bearing being shown mounted thereon in position to be gauged;

Fig. 3 is a rear elevation of the gauge with the rear cover plate removed; and

Fig. 4 is an axial section through the supporting member of the gauge on the line 4—4 in Fig. 1.

The gauge shown in the accompanying drawings comprises an upright casing or housing 4 having a base portion 6 which is perforated for the reception of bolts or similar securing devices whereby the casing may be rigidly secured to a work bench. Projecting horizontally from the front face 5 of the casing 4 is a cylindrical work receiving and supporting member 7 having an axial bore 8, whose inner end communicates with the interior of said casing through an opening 9 in the front wall thereof.

Located within the axial bore 8 of the supporting member 7, and extending rearwardly into the interior of the casing 5, is a lever arm 10. The lever arm 10 is provided at its front end with an elongated vertical notch 11 adapted to receive a vertically disposed cylindrical contact pin 12 and a horizontally disposed cylindrical fulcrum stud 13. The contact pin 12 is of reduced width midway of its length to fit within the notch 11 of the lever arm 10 and is removably held therein by means of a horizontal screw 14. The contact pin 12 has a free sliding fit in a transverse bore in the supporting member 7, said bore being disposed with its axis vertical and intersecting the horizontal bore 8 at a point substantially midway of its length.

The fulcrum stud 13 is mounted in the axial bore 8 of the supporting member 7, between the gauge pin 12 and the front end of said member, and has a reduced portion adapted to be embraced by the notch 11 formed in the front end of the lever arm 10. The lever arm 10 is pivotally secured to the fulcrum stud 13 by means of a removable pivot screw 15, which extends horizontally through the interfitting portions of said lever arm and said stud. The hollow supporting member 7 is provided with holes 16, which extend horizontally through one side thereof whereby the screws 14 and 15 may be readily inserted and removed. The contact pin is adapted to contact with the surface of the work at its lower end only, and said end is preferably curved to conform to the radius of the supporting member 7.

The free end of the lever arm 10, in the inoperative position thereof, is supported on the upper end of a vertical stop-pin 17. The stop 17 has a threaded head portion which is threaded through the base of the casing 4 for purposes of adjustment. The free end of the lever arm 10 is held against horizontal movement by means of guide screws 18, which are threaded through the side walls of the casing in axial alinement and engage the lever on opposite sides.

Located within the casing 4, and arranged for vertical swinging movement in the plane of the lever arm 10, is a lever 19, which has a segment gear 20 formed on its upper end and is provided at its lower end with a horizontal spindle 21. The spindle 21 projects on opposite sides of the lever 19 and is rotatably supported above the lever arm 10, adjacent to the free end thereof, by means of alined pivot screws 22, which are threaded through the side walls of the casing and have conical ends that seat in conical depressions in the ends of said spindle. The pivot screws 22 are provided with lock nuts 23 for locking said screws in the desired adjusted position.

The pivoted end of the lever 19 is formed with a shoulder 24 that bears against an adjustable screw 25 which extends upwardly through the free end of the lever arm 10. The free end of the lever arm 10 is split lengthwise as at 26, the split extending through the threaded bore which receives the screw 25. The split portions of the lever arm 10 are adapted to be drawn together about the screw 25 to prevent movement thereof in the direction of its axis, by means of a screw 27, which extends through said split portions.

The segment gear 20 formed on the upper end of the lever 19 meshes with a segment wheel 28 having a horizontal spindle 29, which extends on opposite sides thereof and is rotatably supported at its opposite ends between alined pivot screws 29$^a$. The pivot screws 29$^a$ are threaded through the side walls of the casing 4 and have conical ends which seat in conical depressions in the ends of the spindle 29 of the segment wheel 28. The segment wheel is provided with a radially extending indicator arm 30 whose outer end moves in a slot 31 formed in an arcuate scale plate 32, which is removably secured to the casing 4 and closes the opening in the upper portion thereof. The exterior surface of the scale plate is graduated to give readings in .001 inch.

The lever 19 is held with its shoulder 24 in contact with the screw 25 of the lever 10, and with the segment gear 20 in mesh with the segment wheel 28, by means of a coil spring 33. One end of the spring 33 is secured to the casing 4 and the other end is secured to the lever 19. The screw 25, which transmits motion from the lever 10 to the lever 19, may be adjusted, to bring the indicator arm 30 into the desired position with respect to the markings on the scale in the event of wear of the work engaging end of the contact pin, by means of a vertical adjusting rod 34. This rod is disposed in alinement with the screw and projects upwardly into the interior of the casing through a hole in the base thereof. The adjusting rod is loosely supported within the hole by means of a screw 35; and said rod is formed at its lower end with a knurled operating handle 36 and has a notch 37 formed in its upper end adapted to fit the head of the screw 25. This arrangement permits adjustment of the screw without removing the back plate of the casing.

In the operation of the gauge, a master form having a bore of the desired size and shape is slipped over the cylindrical supporting member 7, whose diameter is from .005 inch to .010 inch smaller than the bore of the master form, and the indicator arm 30 set to zero by adjusting the screw 25. The master form is then removed, leaving the operating parts of the gauge in correct adjustment for gauging bores patterned after the bore of the master form.

In measuring the size and contour of the bore in an article, such for instance as the bore of a conical inner bearing sleeve 38 for a tapered roller bearing, said sleeve is slipped over the work support 7 and moved both longitudinally and circumferentially thereof, to bring the engaging end of the contact pin 12 into a great many positions relative to the surface of the bore. In the event that the bore is accurately formed, the indicator arm remains at the zero mark on the scale. In the event that the bore is of incorrect size or is out of round, tapered or has an uneven surface, such irregularities cause the contact pin to move in the direction of its axis and swing the lever arm 10. It is noted that the contact pin is pivotally supported on the lever 10 and has a free sliding movement in the transverse bore of the work support 7. This arrangement permits the contact pin to move in a substantially straight line in the bore regardless of the slight swinging movement of the lever arm about the pivot screw 15 as a center. In the event that the contact pin is forced upwardly by the irregularity of the bore, such movement causes the free end of the lever arm 10 to swing upwardly, thereby causing the screw 25 at the free end of said lever arm to press against the shoulder 24 of the lever 19. This pressure causes the lever 19 to swing forward against the tension of the spring 33, which movement, by reason of the sector gear connection between the lever 19 and the indicator arm 30, causes the indicator arm to swing upwardly and leave its position between the zero marks on the graduated segment scale. In the event that the irregularity of the bore is such to permit the weight of the free end of the lever arm 10, as well as the downward pressure exerted thereon by the tension of the spring 33 through the lever 19, to force the pin downwardly, the lever 19 is swung rearwardly by the spring 33, which movement causes the indicator arm to swing downwardly away from the zero mark on the graduated segment. With the arrangement described, slight inaccuracies in the diameter, contour and surface of the bore are indicated on the graduated segment on a greatly enlarged scale by reason of the multiplying or amplifying qualities of the levers 10 and 19. The supporting member 7 and the contact pin 12 are removably secured to the casing 4 and lever 10, respectively, whereby the supporting member and contact pin are adapted and replaced with similar members of different sizes, thereby adapting the gauge for use with articles having bores of different diameters.

What I claim is:

1. A gauge comprising a hollow cylindrical work receiving member, a pivot member transversely disposed in said support, a lever arm pivoted at one end on said pivot member, an indicating mechanism operatively connected with the free end of said lever arm to be operated thereby, and a work engaging element projecting from said lever arm between the pivot therefor and the free end thereof, said work engaging element extending at right angles to said lever arm pivot.

2. A gauge comprising a casing having a hollow cylindrical work support, said support having a transverse opening, a pivot member transversely disposed in said support, a lever arm extending axially of said support and having one end fulcrumed on said transverse pivot, an indicating device mounted in said casing and cooperating with the free end of said lever to be actuated thereby, and a gauge pin projecting from said lever arm between the pivot therefor and the free end thereof, said gauge pin extending at right angles to the lever arm pivot and working in the transverse opening in said work support.

3. A gauge comprising a casing having a hollow cylindrical work support, said support having a transverse opening, a pivot member transversely disposed in said support, a lever arm extending axially of said support and having one end fulcrumed on said transverse pivot, an indicating device mounted in said casing and cooperating with the free end of said lever to be actuated thereby, and a guage pin projecting from said lever arm between the pivot therefor and the free end thereof, said gauge pin extending at right angles to the lever arm pivot and working in the transverse opening in said work support, said work support and said gauge pin being detachably secured to said casing and said lever arm respectively, whereby said members are adapted to be replaced by similar members of different sizes.

4. A gauge comprising a supporting casing having an indicating mechanism and a projecting cylindrical work support, said work support being formed with intersecting axially and transversely extending bores, a fulcrum block removably positioned within said axial bore between the outer end thereof and said transverse bore, a lever arm extending longitudinally within said axial bore, said lever arm being pivotally supported at one end on said fulcrum block for movement in the plane of the transverse bore-axis, the opposite free end of said arm operatively engaging said indicating mechanism to operate the latter, and a contact pin pivotally secured to said lever arm and having a free sliding fit in said transverse bore, whereby movement of said pin in the direction of its axis causes said lever to swing on its pivot and operate said indicating mechanism.

5. A gauge comprising an upright casing having an indicating mechanism comprising a graduated segment and a horizontally pivoted indicator arm cooperating therewith, said casing having a cylindrical work support projecting horizontally therefrom provided with intersecting horizontal and vertical bores, a lever arm extending longitudinally within said horizontal bore, said lever arm being pivotally supported at one end in said horizontal bore for vertical swinging movement, a contact pin pivotally secured to said lever arm and having a free sliding fit in said vertical bore, an upright lever pivotally supported in said casing adjacent to the free end of said lever arm and operatively connected with said indicator arm, means for holding said upright lever in engagement with the free end of said lever arm, and means on the free end of said lever arm for adjusting said indicator arm with relation to said graduated segment.

6. A gauge comprising an upright casing having an indicating mechanism comprising a graduated segment and a horizontally pivoted indicator arm cooperating therewith, said casing having a cylindrical work support projecting horizontally therefrom provided with intersecting horizontal and vertical bores, a removable horizontal pivot in said horizontal bore, a lever arm extending longitudinally within said horizontal bore, said lever being supported at one end on said removable horizontal pivot, a contact pin mounted in said vertical bore and removably secured to said lever arm adjacent to the pivot thereof, means for supporting the free end of said lever arm in its inoperative position, an upright lever having one end pivotally supported in said casing adjacent to the free end of said lever arm and having a sector gear and wheel connection with the pivoted end of said indicator arm, a pin mounted on the free end of said lever arm and adapted to contact with said upright lever at a point offset horizontally from the pivot thereof, yieldable means for holding said upright lever in engagement with said pin, and means for adjusting said pin in the direction of its axis.

7. A gauge comprising an upright casing having an indicating mechanism comprising a graduated segment, a segment wheel journaled on a horizontal axis and having a radially extending indicator arm movable across said graduated segment, said casing having a cylindrical work support projecting horizontally therefrom provided with intersecting horizontal and vertical bores, a fulcrum stud in said horizontal bore between the outer end thereof and said vertical bore, a lever arm extending longitudinally within said horizontal bore and supported at its forward end in said stud for vertical swinging movement, a contact pin mounted in said vertical bore and removably secured to said lever arm, means for supporting the free end of said lever arm in its inoperative position, a stud extending vertically through the free end of said lever arm, an upright lever arm having its lower end pivotally supported in said casing above said longitudinally extending lever arm and adjacent to the outer end thereof, said upright lever having a segment gear formed on its upper end adapted to mesh with said segment wheel and having a shoulder at its lower end adapted to bear against the upper end of said lever arm stud, yieldable means for holding said shoulder down on said stud, and means for adjusting said stud in the direction of its axis.

Signed at Canton, Ohio, this 4th day of January, 1922.

OSWALD SCHLAUPITZ.